United States Patent [19]

Hunter

[11] 4,183,430

[45] Jan. 15, 1980

[54] GRAIN HANDLING FLIGHT CONVEYOR ASSEMBLY

[75] Inventor: William E. Hunter, Mackinan, Ill.

[73] Assignee: Hunter Mfg., Inc., Ill.

[21] Appl. No.: 827,546

[22] Filed: Aug. 25, 1977

[51] Int. Cl.² .......................................... B65G 19/28
[52] U.S. Cl. ..................................... 198/735; 198/841
[58] Field of Search ............... 198/735, 841, 860, 861, 198/617; 308/273 R, 238

[56] References Cited

U.S. PATENT DOCUMENTS

| | | | |
|---|---|---|---|
| 2,616,552 | 11/1952 | Duncan | 198/860 |
| 2,910,169 | 10/1959 | Russell | 198/735 |
| 2,985,494 | 5/1961 | Terhorst | 308/238 |
| 4,051,948 | 10/1977 | Sackett | 198/735 |

OTHER PUBLICATIONS

"Flowmaster Conveyor", Hunter Mfg. Inc., pp. 49–52, No. 31576.

*Primary Examiner*—Joseph E. Valenza
*Attorney, Agent, or Firm*—Hill, Van Santen, Steadman, Chiara & Simpson

[57] ABSTRACT

A grain handling flight conveyor assembly including a flight conveyor operating in a trough of rectangular cross section, said trough having a cover to make it dust and waterproof, and a wear liner on the bottom of said trough so constructed as to be replaceable without removing the cover and taking out the conveyor.

6 Claims, 7 Drawing Figures

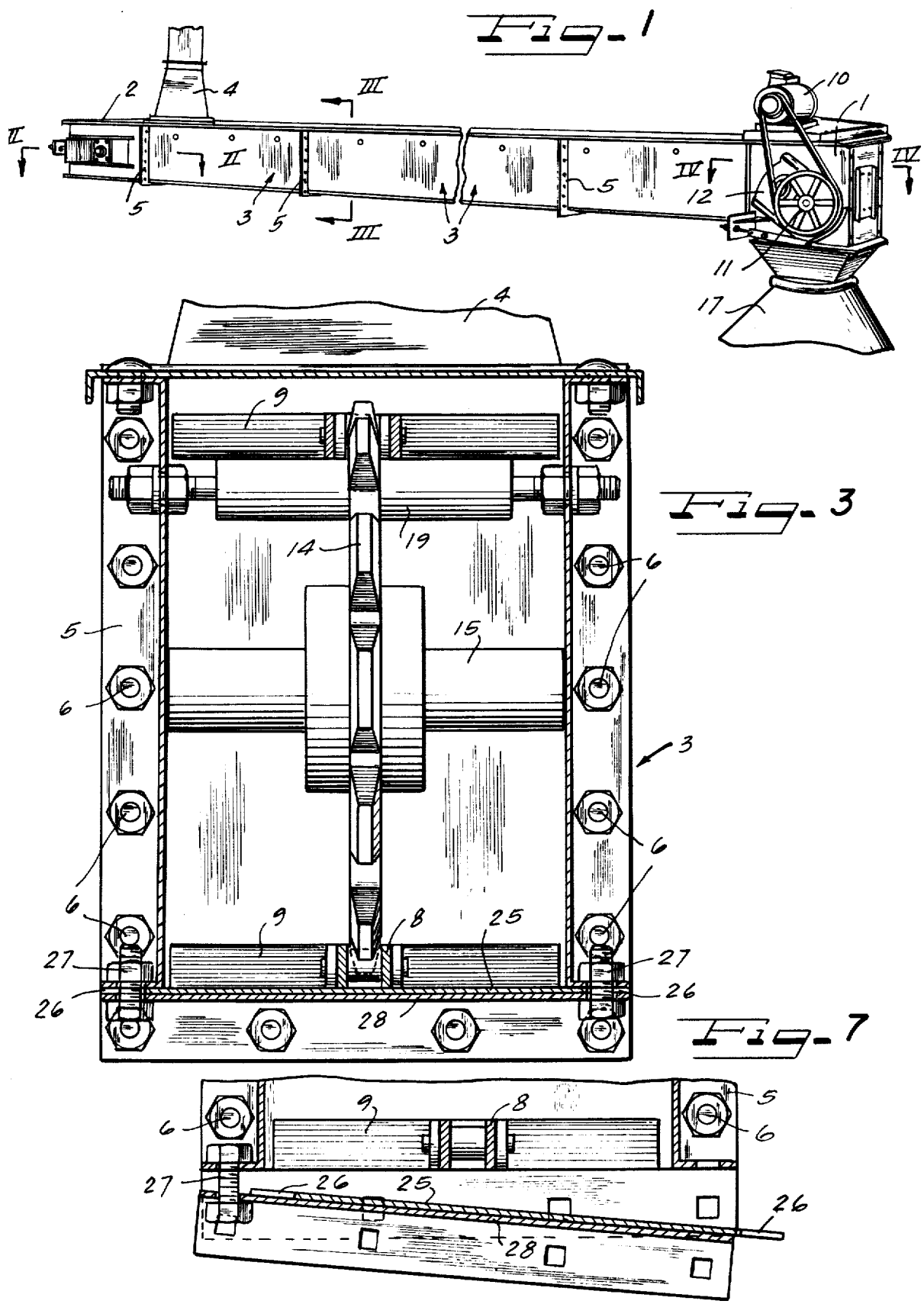

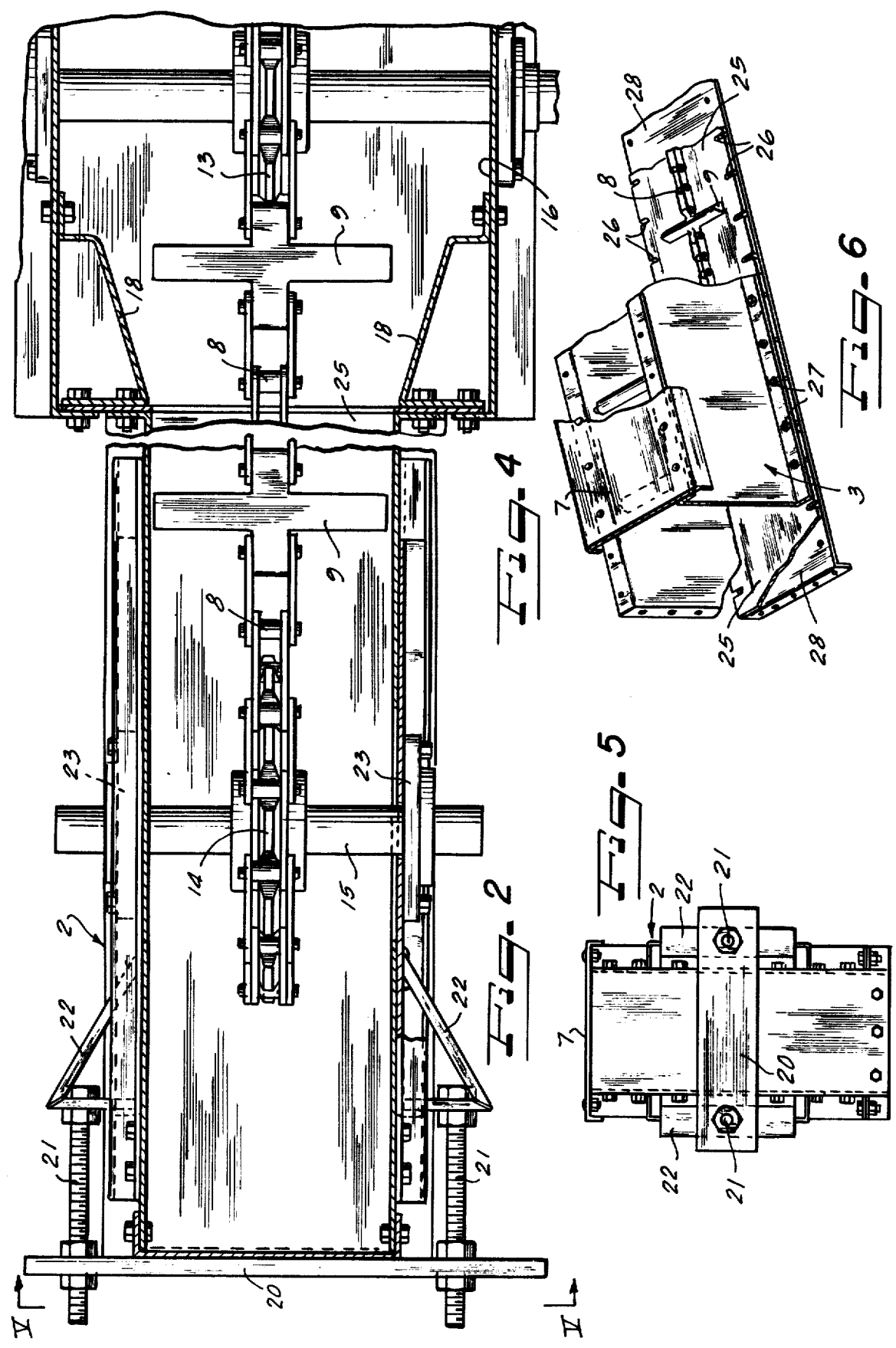

GRAIN HANDLING FLIGHT CONVEYOR ASSEMBLY

BACKGROUND OF THE INVENTION

Prior Art

The most pertinent prior art known to applicant is a conveyor assembly built by applicant's assignee that is substantially like the conveyor assembly herein shown and described, with one important exception. In a device of this kind, an endless chain carrying flights operates inside a trough having a cover thereover to keep out dust and moisture. The conveyor trough and cover are built in sections for convenience of assembly and an inlet is provided in the section next to the tail section. In conveyor assemblies of this kind it is desirable to use a wear plate under the conveyor. In the prior conveyor assembly the wear plate was also of a trough-shape except the side walls were far less in height than the side walls of the outside trough. That wear plate in the prior conveyor could not be removed without taking all the section covers off, disconnecting and taking off the inlet and removing the entire conveyor and flights and putting in the wear plate through the top of the outside trough. It was a most tedious, expensive and irksome job especially on a conveyor assembly that might be in excess of 200 feet in length. The length of conveyor varies of course depending upon the distance the grain is to be conveyed, and to remove the cover, the conveyor and its flights, and the inlet upon any length of conveyor is a time consuming and expensive proposition to replace a worn wear plate.

BRIEF SUMMARY OF THE INVENTION

The instant invention includes a wear plate that is flat and has a row of notches along each side edge to receive therein the side bolts which secure the outwardly extending flange on the side walls of the trough to the bottom of the trough. When the bolts on one side are removed, and those on the other side are loosened, the trough bottom is dropped as far as the loosening of the bolts on one side is concerned. The wear plate will of course drop to the bottom at an angle permitting the wear plate to be slid out from under the conveyor and over the bottom plate to be disposed of. A new wear plate may then be slid over the bottom of the trough the notches engaged over the loosened bolts, and then the removed bolts reinserted and all the bolts tightened thus holding the new wear plate in position. This operation for each section takes but a few minutes and it is not necessary to remove anything out of the trough except the liner plate that is to be replaced. The conveyor stays in place. The top stays on the trough. The intake is not removed but remains in place whereby considerable time and labor is saved in replacing a wear plate in any section or in all the sections of the conveyor trough.

BRIEF DESCRIPTION OF THE DRAWING FIGURES

FIG. 1 is a fragmentary perspective view of a conveyor assembly embodying the improvements of the instant invention;

FIG. 2 is an enlarged plan sectional view of the tail section, taken as substantially indicated by the section line II—II of FIG. 1;

FIG. 3 is a greatly enlarged vertical section taken substantially as indicated by the line III—III of FIG. 1;

FIG. 4 is an enlarged fragmentary plan section through the head section of the assembly taken substantially as indicated by the line IV—IV of FIG. 1;

FIG. 5 is a view of an elevation of the rear end of the tail section taken substantially as indicated by the arrow 5 of FIG. 2;

FIG. 6 is a fragmentary isometric view with parts broken away showing how the liner is attached to the bottom of the conveyor trough; and FIG. 7 is a transverse sectional view through the lower portion of FIG. 3 illustrating the manner in which a used wear plate is removed and the new wear plate installed, the chain and a flight being left in supported position for purposes of clarity, and the angle of slope of the wear plate is exaggerated for the same reason.

DETAILED DESCRIPTION

In order to present an environment for the instant invention to better point out its advantages, it is necessary to herein describe a goodly portion of the prior art conveyor discussed hereinabove. The assembly, especially the trough, includes a head section 1, a tail section 2, and as many intermediate sections 3 as may be required to cover the conveying distance. Sections 3 are all alike except the one next to the tail section is provided with an inlet 4. As seen in FIG. 1 and also in FIG. 3 the sections at the ends thereof have outwardly extending flanges as indicated at 5 and so they may be bolted together by bolts 6. Since it is desirable to keep out dust and unexpected moisture when conveying grain, the sections are all provided with a cover 7 bolted down to the sections.

Inside the covered trough, an endless conveyor operates, which conveyor includes a chain 8 carrying a plurality of flights 9. The flights are preferably triangular in cross section as seen in FIG. 6 to more gently handle the grain. The head section 1 carries on its top a motor 10 which drives a pulley 11. With reference to FIG. 4 it will be seen that the chain passes around a drive sprocket 13 which is connected through speed reduction means 12 to the drive pulley 11. Another sprocket 14 is mounted in the tail section 2 on a shaft 15. Both sprockets 13 and 14 turn counterclockwise so that the return reach of the conveyor is above the load carrying reach of the conveyor. The conveyor discharges its load as it enters the head section 1 before it reaches the sprocket 13, this section 1 being virtually bottomless and moving grain may be discharged right through the bottom opening 16 into any suitable form of receiver as indicated 17 in FIG. 1. After a conveyor flight has dropped its load through the bottom of the head section 1 it passes around the sprocket 13 to make its return journey and passes between a pair of deflectors or guides 18-18 which prevent the flight 9 from catching on the edge of the head section, but on the contrary the flight will pass straight and easily into the next adjoining section 3. On the return journey, the chain and flights pass over a plurality of relatively large rollers 19 as seen at the top of FIG. 3 which are large enough to lessen friction and permit easy passing of the conveyor.

After the conveyor has fully been assembled in the covered trough, the slack in the working reach of the conveyor is taken up by means at the end of the tail section 2. These means include a relatively heavy steel plate 20 welded to the rear end of the section 2 and to which a pair of threaded rods 21—21 are connected to the ends extending beyond reach of the section. These rods are also connected to take up brackets 22—22 which are in turn connected to shaft and flange bearings 23—23 of the sprocket shaft 15. No slippage can occur when the threaded rods 21—21 are tightened and the pressure is minus bending stresses but only compression stress when the shaft 15 moves with the sprocket toward the bar 20.

Since the chain and flight on the working reach of the conveyor operate flatly against the under surface as seen clearly in FIG. 5 of the drawings, wear plates have been utilized to preserve the bottom of the trough. Preferably, these wear plates or liners have been steel plates of the type sold by United States Steel Corporation under the trademark COR-TEN which has a hard surface and less friction on the flights. But, nonetheless, these liners eventually need replacement, a few, or all. But heretofore such replacement necessitated the removal of the trough cover of the intake through the cover and the complete conveyor and flights so that the liners could be placed in through the top of the trough.

The instant invention effectively solves that difficulty with the use of a specially constructed liner 25 for each section except the head section which is bottomless. As seen in FIGS. 3, 6 and 7, this liner 25 is provided with a row of notches 26 preferably along each side edge thereof spaced in keeping with the bolts 27 which join flange of a side member, the liner 25, and the trough bottom 28, a notch 26 of the liner embracing a bolt 27.

When it becomes necessary to replace the liner or wear plate 25 with a new one, the liner may be removed from either side of the trough, depending upon which side of the trough there is the most feasible working conditions. Assuming that those conditions occur on the right hand side of the trough looking from the trough toward the head section 1, the bolts 27 connecting the side plate to the base 28 with the liner therebetween are removed entirely. The bolts 27 on the opposite side are loosened. This will permit the liner and trough bottom to assume the position seen in FIG. 7, these two parts pivoting downward as much as permited by the loosened bolts so that the liner or wear plate 25 may be slid off the bottom 28 underneath the conveyor as indicated in FIG. 7. All that is necessary then is to take the old wear plate 25 out for disposition and slide a new wear plate on top of the bottom 28 back into position with the notches 26 embracing the loosened bolts 27 and then the parts may be pushed upwardly into original position the bolts 27 that were loosened are tightened and the bolts that were removed are replaced and tightened and the new liner is positioned properly. In the same manner a liner can be positioned in the tail section 2 without interfering with the chains and flights and sprocket.

This expeditious and timesaving manner of replacing an old wear plate with a new wear plate in the section of the entire system or more sections or even all of them is highly important in connection with the financial upkeep of the system. The system is shut down for as short a time as possible and the replacement job is accomplished with very little labor and a comparatively small amount of time when compared with the removal of the trough top all the way through, the removal of the inlet core and the dismantling of the entire conveyor 14 and then the reassemblage of the conveyor system replacement of the top on the trough and affixing the inlet and connecting the same grain source. While replacement of the wear plates or liners may be necessary only after a long time of usage, when it becomes necessary the amount of time and labor saved is tremendous.

This manner of removal and replacement of a wear plate through the bottom of a closed trough and beneath the operating equipment in that trough apparently embodies a new method of replacing a liner or wear plate and the value of such a method is quite realistic.

I claim:

1. A material moving conveyor system including a sectionalized trough with a flight conveyor operable therein, said trough being closed at the top, and a bottom plate connected by a series of bolts to outwardly extending flanges on the sides of the trough, said trough having an inlet adjacent one end and an outlet at the other end, and wherein the improvement comprises
    a wear plate lying flat on the inside face of said bottom plate and on the outside face of said bottom flanges, and said wear plate having a row of notches in a side margin thereof corresponding in number and placement to partially surround each of said bolts in that margin, whereby when the bolts along the opposite side are removed and the bolts along said side margins are loosened said bottom plate and said wear plate will tilt from the loosened bolts and said wear plate may be slid out of said trough without disturbing anything above said wear plate.
2. The system of claim 1, wherein
    a similar but new wear plate may be slid over said bottom and the bolts retightened and replaced.
3. The system of claim 1, wherein
    said wear plate has a row of notches in each side edge thereof spaced in conformity with the spacing of said bolts to partially embrace said bolts.
4. The system of claim 1, including
    a row of notches in said wear plate along each side margin, to permit removal and a new wear plate placed in said trough over said bottom from either side of said trough whichever may be more feasible for the operation.
5. The system of claim 1, wherein
    said wear plate has a row of notches along each side margin to permit pivoting of the bottom from either side by removing bolts from the opposite side and loosening bolts on the pivot side, whereby a wear plate may be removed and a new wear plate replaced in the trough without removing the trough bottom.
6. The method of selectively inserting and removing a liner plate having a wear resisting surface in a fabricated sheet-formed trough conveyor of the type having flanged side walls and an undersurface wall underlying said flanged side walls and a plurality of nuts and bolts passing through registering apertures formed in the flanges and in the undersurface wall, which method includes the steps of
    forming a plurality of notches in a liner plate corresponding in number and placement to partially surround each of said bolts passing through said flanges,
    selectively fastening and loosening the nuts and bolts during insertion and removal of the liner plate to place the liner plate in firm assembly with the trough conveyor or to loosen the liner plate for removal,
    loosening the bolts only on one side of the trough sufficient to form a clearance into or from which the liner plate may be inserted or removed,
    and selectively completely removing the bolts on the opposite side of the trough to facilitate insertion or withdrawal of the liner plate,
    inserting or removing the liner plate by sliding the liner plate between the flanged side walls and the underlying undersurface wall,
whereby the walls of the trough conveyor need not be disassembled in the replacement of the liner plate.

* * * * *